United States Patent
Izumi et al.

(10) Patent No.: US 7,970,371 B2
(45) Date of Patent: Jun. 28, 2011

(54) RECEIVING APPARATUS, PROGRAM AND RECEIVING METHOD

(75) Inventors: Seiichi Izumi, Kanagawa (JP); Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 602 days.

(21) Appl. No.: 12/129,133

(22) Filed: May 29, 2008

(65) Prior Publication Data

US 2008/0298517 A1 Dec. 4, 2008

(30) Foreign Application Priority Data

Jun. 4, 2007 (JP) ................. P2007-148515

(51) Int. Cl.
*H04B 1/10* (2006.01)
*H04K 3/00* (2006.01)

(52) U.S. Cl. .................. 455/306; 375/342

(58) Field of Classification Search .......... 455/203, 455/306–307; 375/321, 342–344
See application file for complete search history.

(56) References Cited

U.S. PATENT DOCUMENTS

| 5,465,410 A * | 11/1995 | Hiben et al. ............... 455/266 |
| 7,729,679 B1 * | 6/2010 | Lee ............................ 455/295 |

FOREIGN PATENT DOCUMENTS

| JP | 2003-289262 | 10/2003 |
| JP | 2006-14258 | 1/2006 |
| JP | 2006-262331 | 9/2006 |
| WO | WO 2006/020520 | 2/2006 |
| WO | WO 2006/137324 A1 | 12/2006 |

* cited by examiner

*Primary Examiner* — Lee Nguyen
(74) *Attorney, Agent, or Firm* — Finnegan, Henderson, Farabow, Garrett & Dunner, L.L.P.

(57) ABSTRACT

A receiving portion for receiving a wireless signal generated on the basis of a baseband signal having either a predetermined frequency band or a baseband signal having any of partial frequency bands; a signal processing portion for generating the baseband signal; a band shifter for shifting the frequency band of the baseband signal by such an amount of shift that the center frequency of at least a specific partial frequency band is in the vicinity of 0 Hz; a filter portion for outputting a partial signal, which is gained by sampling a signal component of the frequency band having a bandwidth of the specific partial frequency band with approximately 0 Hz as the center frequency, from the baseband signal; and a determining portion for determining the frequency band of the baseband signal on the basis of the partial signal.

9 Claims, 13 Drawing Sheets

1

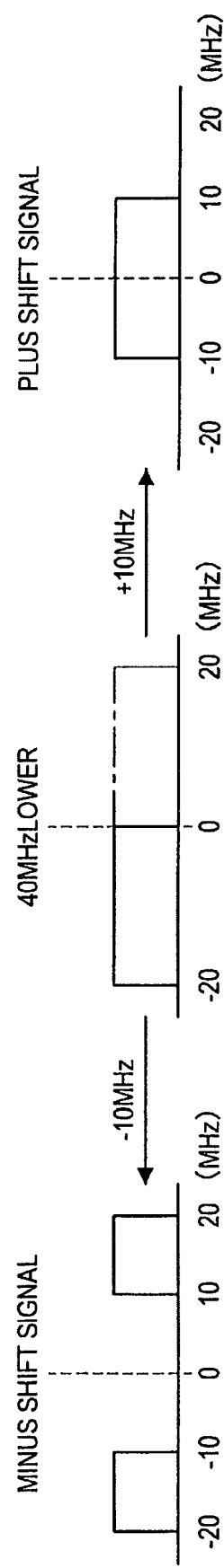

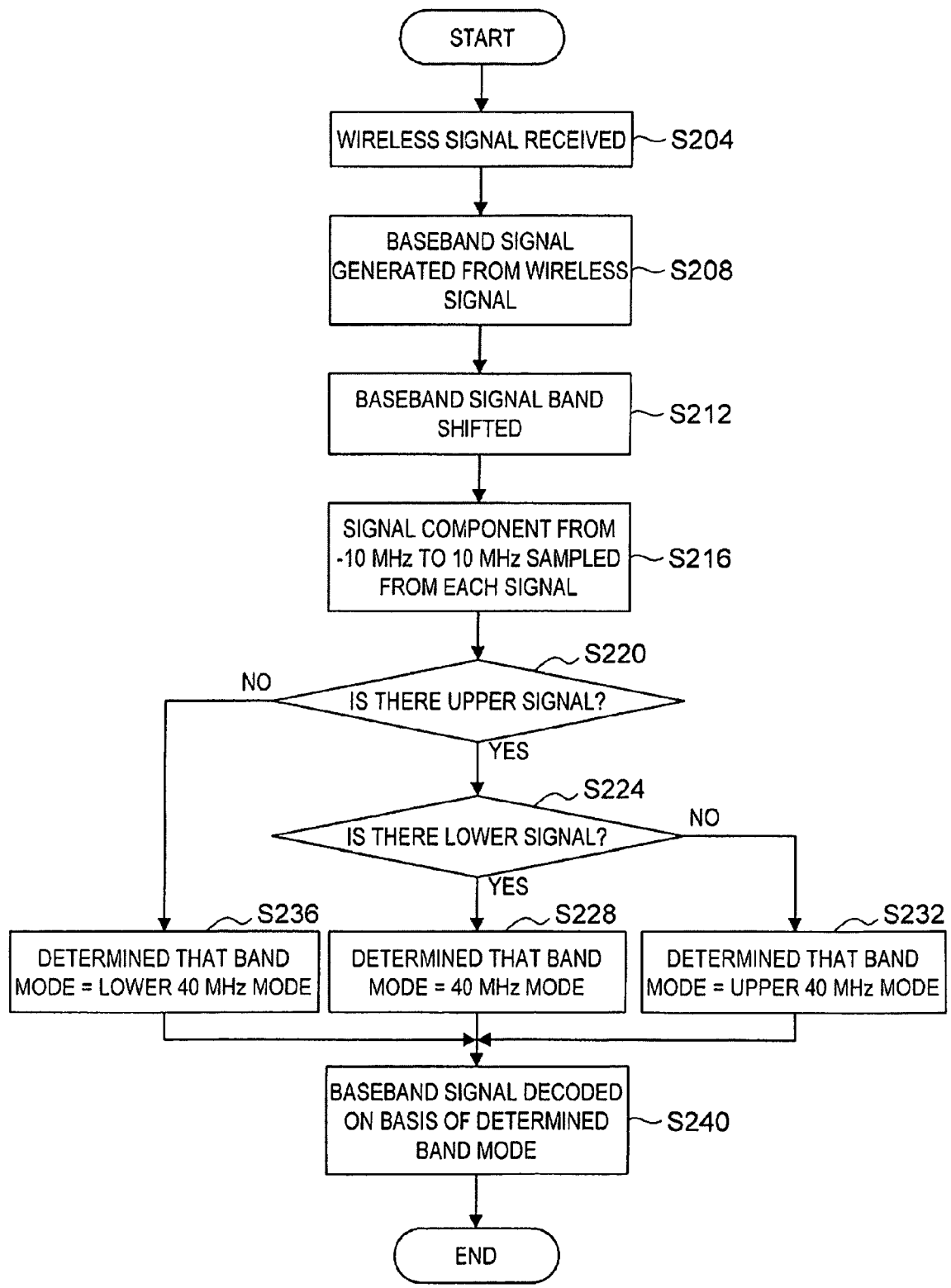

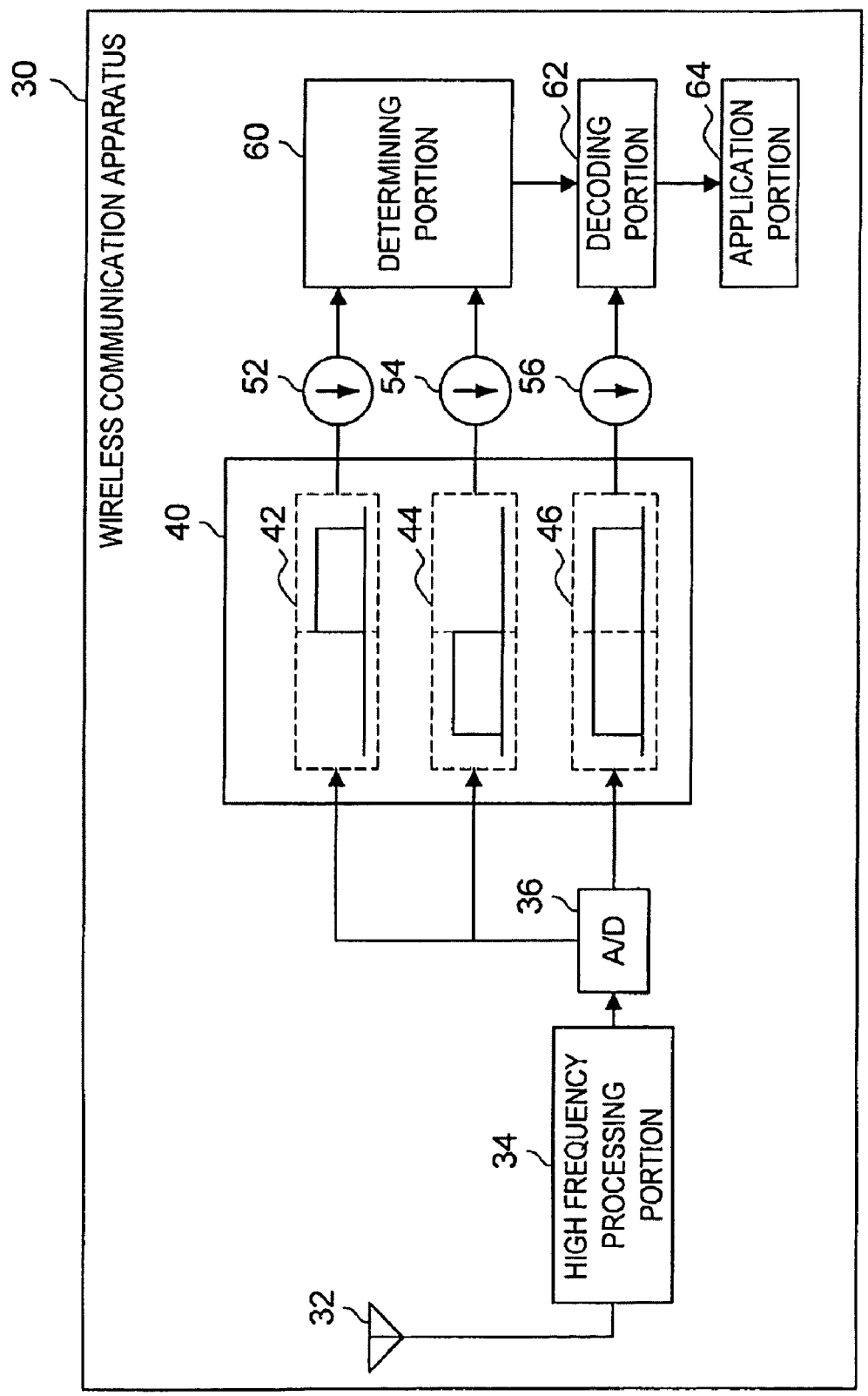

RECEIVING APPARATUS, PROGRAM AND RECEIVING METHOD

CROSS REFERENCES TO RELATED APPLICATIONS

The present invention contains subject matter related to Japanese Patent Application JP 2007-148515 filed in the Japan Patent Office on Jun. 4, 2007, the entire contents of which being incorporated herein by reference.

BACKGROUND OF THE INVENTION

1. Field of the Invention

The present invention relates to a receiving apparatus, a program and a receiving method.

2. Description of the Related Art

In recent years, wireless communication systems on the basis of the IEEE (Institute of Electrical and Electronic Engineers) 802.11 Standard have become widespread. Wireless communication apparatuses, including transmitting apparatuses and receiving apparatuses which form these wireless communication systems, are advantageous in comparison with wired communication systems in that they have freedom, such as portability.

In addition, as described in the International Publication No. 2006-020520, a 20 MHz mode using a frequency band having a bandwidth of 20 MHz, a 40 MHz mode using a frequency band having a bandwidth of 40 MHz, an upper 40 MHz mode using a frequency band of 20 MHz on the upper side of the 40 MHz mode, or a lower 40 MHz mode using a frequency band of 20 MHz on the lower side of the 40 MHz mode are assumed as band modes used for wireless communication in IEEE 802.11n. Accordingly, it is necessary for the receiving apparatuses to determine which band mode the received wireless signal corresponds to so as to carry out a decoding process in accordance with the determined band mode when a wireless signal is received.

As the method for determining the band mode of a wireless signal, a method for providing a receiving apparatus with two types of band-pass filters for sampling a signal component in the frequency band corresponding to the upper 40 MHz mode and the lower 40 MHz mode (for example, band-pass filters having pass-bands of −20 MHz to 0 MHz and 0 MHz to 20 MHz) and inputting a wireless signal that has been converted to a baseband signal into each band-pass filter can be cited. In the case where only a signal component in the frequency band corresponding to the upper 40 MHz mode is sampled from the baseband signal, it can be determined to be the upper 40 MHz mode, and in the case where only a signal component in the frequency band corresponding to the lower 40 MHz mode is sampled from the baseband signal, it can be determined to be the lower 40 MHz mode.

SUMMARY OF THE INVENTION

In accordance with the above-described determination method, however, it is necessary to provide the receiving apparatus with two types of band-pass filters in order to determine the band mode of a wireless signal. In addition, it is necessary to design the band-pass filters as Hilbert filters in order for the filter to have pass-bands of −20 MHz to 0 MHz and 0 MHz to 20 MHz, for example. As a result, an issue arises such that the configuration of the receiving apparatus becomes complicated in accordance with the above-described determination method.

Thus, the present invention is provided in view of the above-described issue, and it is desirable to provide a novel and improved receiving apparatus, a program and a receiving method where it is possible to determine the frequency band of a baseband signal while simplifying the configuration.

According to an embodiment of the present invention, there is provided a receiving apparatus including: a receiving portion for receiving a wireless signal generated on the basis of a baseband signal having either a predetermined frequency band or a baseband signal having any of partial frequency bands gained by dividing the predetermined frequency band into a number of portions; a signal processing portion for carrying out a frequency conversion on the wireless signal received by the receiving portion so as to generate the baseband signal; a band shifter for shifting the frequency band of the baseband signal by such an amount of shift that the center frequency of at least a specific partial frequency band is in the vicinity of 0 Hz; a filter portion for outputting a partial signal, which is gained by sampling a signal component of the frequency band having a bandwidth of the specific partial frequency band with approximately 0 Hz as the center frequency, from the baseband signal of which the frequency band has been shifted by the band shifter; a determining portion for determining the frequency band of the baseband signal on the basis of the partial signal outputted from the filter portion; and a decoding portion for decoding the baseband signal by using the results of determination by the determining portion.

In this configuration, the filter portion outputs a partial signal gained by sampling a signal component of a frequency band having a bandwidth of a specific partial frequency band with approximately 0 Hz as the center frequency from the baseband signal of which the frequency band has been shifted by the band shifter by such an amount of shift that the center frequency of a specific partial frequency band becomes approximately 0 Hz. That is to say, the filter portion can output a partial signal from the baseband signal of which the frequency band has been shifted by the band shifter by such an amount of shift that the center frequency becomes approximately 0 Hz in the case where the baseband signal has a specific partial frequency band. Meanwhile, the filter portion does not output a partial signal from the baseband signal of which the frequency band has been shifted by the band shifter by such an amount of shift that the center frequency of a specific partial frequency band becomes approximately 0 Hz in the case where the frequency band of the baseband signal is a partial frequency band other than the specific partial frequency band.

Accordingly, the determining portion can determine whether or not the frequency band of the baseband signal is the specific partial frequency band on the basis of whether or not the filter portion outputs a partial signal from the baseband signal of which the frequency band has been shifted by the band shifter by such an amount of shift that the center frequency of the specific partial frequency band becomes approximately 0 Hz. In addition, the filter for sampling the frequency band of which the center frequency is 0 MHz can be formed more simply than filters for sampling only a positive frequency component or a negative frequency component. That is to say, the filter portion of this receiving apparatus has properties of sampling a frequency band with 0 MHz as the center frequency, and therefore, it is possible for this receiving apparatus to determine the frequency band of the baseband signal while simplifying the configuration of the filter portion.

The partial frequency band may include a lower band or an upper band, which are gained by dividing the predetermined frequency band into two portions, the band shifter may shift the frequency band of the baseband signal by such an amount of shift that the center frequency of a specific partial frequency band of either the lower band or the upper band becomes approximately 0 Hz, the filter portion may output a partial signal, which is gained by sampling a signal component in the frequency band having a bandwidth of the specific partial frequency band with approximately 0 Hz as the center frequency, and the entire signal, which is gained by sampling a signal component of the predetermined frequency band, from the baseband signal of which the frequency band has been shifted by the band shifter, and may include: a rear stage shifter for shifting the frequency band of the partial signal that has been outputted from the filter portion by the amount of shift towards the opposite side as the band shifter; and a subtracting portion for subtracting the partial signal of which the frequency band has been shifted by the rear stage shifter from the entire signal that has been outputted from the filter portion, and the determining portion may determine the frequency band of the baseband signal on the basis of the partial signal outputted from the filter portion and the signal which is gained through subtraction by the subtracting portion.

In this configuration, the filter portion outputs a partial signal gained by sampling a signal component of a frequency band having a bandwidth of a specific partial frequency band with approximately 0 Hz as the center frequency from the baseband signal of which the frequency band has been shifted by the band shifter by such an amount of shift that the center frequency of the specific partial frequency band of either the lower band or the upper band becomes approximately 0 Hz. That is to say, in the case where the specific partial frequency band and the frequency band of the baseband signal coincide with each other, the filter portion can output a partial signal. In addition, the subtracting portion subtracts a partial signal of which the band has been shifted from the entire signal by the rear stage shifter, and thus, outputs a signal component of the partial frequency band (lower band or upper band) other than the specific partial frequency band included in the baseband signal.

Accordingly, the determining portion can determine that the frequency band of the baseband signal is the specific partial frequency band in the case where only a partial signal from the filter portion is detected and that the frequency band of the baseband signal is a partial frequency band other than the specific partial frequency band in the case where only a signal outputted from the subtracting portion is detected. In addition, the determining portion can determine that the frequency band of the baseband signal is the predetermined frequency band in the case where both a partial signal from the filter portion and a signal outputted from the subtracting portion are detected. Furthermore, it is not necessary for this receiving apparatus to be provided with three filters in the filter portion, and therefore, it is possible to further simplify the configuration of the filter portion.

According to another embodiment of the present invention, there is provided a receiving apparatus including: a receiving portion for receiving a wireless signal which is generated on the basis of any baseband signal from among a baseband signal having a predetermined frequency band, a baseband signal having the lower band gained by dividing the predetermined frequency band into two portions, and a baseband signal having the upper band gained by dividing the predetermined frequency band into two portions; a signal processing portion for carrying out a frequency conversion on the wireless signal received by the receiving portion so as to generate the baseband signal that has been digitalized at a predetermined sampling rate; a filter portion for sampling and outputting from the inputted signal a signal component of a frequency band having a bandwidth with approximately 0 Hz as the center frequency, which is gained by multiplying the sampling rate of the inputted signal by the ratio of the bandwidth of the predetermined frequency band to the predetermined sampling rate; a thinning portion for thinning into half the sampling rate of the baseband signal that has been inputted from the signal processing portion into the filter portion and outputted from the filter portion; a band shifter for shifting the frequency band of the baseband signal of which the sampling rate has been thinned by the thinning portion by such an amount of shift that the center frequency of the lower band or the center frequency of the upper band becomes approximately 0 Hz and inputting the resulting frequency band into the filter portion; a determining portion for determining the frequency band of the baseband signal that has been generated by the signal processing portion on the basis of the baseband signal that has been inputted from the band shifter into the filter portion and outputted from the filter portion; and a decoding portion for decoding the baseband signal by using the results of determination by the determining portion.

The filter portion may have a first register group for holding sample values of the baseband signal that has been inputted from the signal processing portion in chronological sequence, a second register group for holding sample values of the baseband signal that has been inputted from the band shifter in chronological sequence, and a calculating portion for carrying out weighing addition, according to which weight is given to each sample value held in the first register group or the second register group and the respective sample values are added up, and then, outputting the resulting value to the thinning portion or the determining portion, and the calculating portion may alternately carry out weighing addition of each sample value held in the first register group and weighing addition of each sample value held in the second register group in sequence.

In this configuration, the calculating portion switches between carrying out weighing addition on sample values held in the first register group and carrying out weighing addition on sample values held in the second register group. That is to say, weighing addition on sample values held in the first register group and weighing addition on sample values held in the second register group can be carried out simply by providing one calculating portion, and therefore, the configuration of the filter portion can be simplified.

The calculating portion may switch between the positive and the negative of the weight added to the sample value held in the register at the center of the second register group every time weighing addition is carried out on each sample value held in the second register group. In this configuration, the calculating portion can alternately output signal components in the upper band and in the lower band included in the baseband signal every time weighing addition of each sample value held in the second register group is carried out.

According to another embodiment of the present invention, there is provided a program for allowing a computer to function as a receiving apparatus including: a receiving portion for receiving a wireless signal generated on the basis of a baseband signal having either a predetermined frequency band or a baseband signal having any of partial frequency bands gained by dividing the predetermined frequency band into a number of portions; a signal processing portion for carrying out a frequency conversion on the wireless signal received by the receiving portion so as to generate the baseband signal; a band shifter for shifting the frequency band of the baseband signal by such an amount of shift that the center frequency of at least a specific partial frequency band is in the vicinity of 0 Hz; a filter portion for outputting a partial signal, which is gained by sampling a signal component of the frequency band having a bandwidth of the specific partial frequency band with approximately 0 Hz as the center frequency, from the baseband signal of which the frequency band has been shifted by the band shifter; a determining portion for determining the frequency band of the baseband signal on the basis of the partial signal outputted from the filter portion; and a decoding portion for decoding the baseband signal by using the results of determination by the determining portion.

This program allows the hardware source of a computer, including, for example, a CPU, a ROM or a RAM, to function as a receiving portion, a band shifter and a filter portion, as described above. That is to say, it is possible to make a computer using this program function as the receiving apparatus.

According to another embodiment of the present invention, there is provided a program for allowing a computer to function as a receiving apparatus including: a receiving portion for receiving a wireless signal which is generated on the basis of any baseband signal from among a baseband signal having a predetermined frequency band, a baseband signal having the lower band gained by dividing the predetermined frequency band into two portions, and a baseband signal having the upper band gained by dividing the predetermined frequency band into two portions; a signal processing portion for carrying out a frequency conversion on the wireless signal received by the receiving portion so as to generate the baseband signal that has been digitalized at a predetermined sampling rate; a filter portion for sampling and outputting from the inputted signal a signal component of a frequency band having a bandwidth with approximately 0 Hz as the center frequency, which is gained by multiplying the sampling rate of the inputted signal by the ratio of the bandwidth of the predetermined frequency band to the predetermined sampling rate; a thinning portion for thinning into half the sampling rate of the baseband signal that has been inputted from the signal processing portion into the filter portion and outputted from the filter portion; a band shifter for shifting the frequency band of the baseband signal, of which the sampling rate has been thinned by the thinning portion, by such an amount of shift that the center frequency of the lower band or the center frequency of the upper band becomes approximately 0 Hz and inputting the resulting frequency band into the filter portion; a determining portion for determining the frequency band of the baseband signal that has been generated by the signal processing portion on the basis of the baseband signal that has been inputted from the band shifter into the filter portion and outputted from the filter portion; and a decoding portion for decoding the baseband signal by using the results of determination by the determining portion.

This program allows the hardware source of a computer, including, for example, a CPU, a ROM or a RAM, to function as a receiving portion, a band shifter and a filter portion, as described above. That is to say, it is possible to make a computer using this program function as the receiving apparatus.

According to another embodiment of the present invention, there is provided a receiving method including the steps of: receiving a wireless signal generated on the basis of a baseband signal having either a predetermined frequency band or a baseband signal having any of partial frequency bands gained by dividing the predetermined frequency band into a number of portions; carrying out frequency conversion on the wireless signal so as to generate the baseband signal; shifting the frequency band of the baseband signal by such an amount of shift that the center frequency of at least a specific partial frequency band is in the vicinity of 0 Hz; outputting a partial signal, which is gained by sampling a signal component of the frequency band having a bandwidth of the specific partial frequency band with approximately 0 Hz as the center frequency, from the baseband signal of which the frequency band has been shifted; determining the frequency band of the baseband signal on the basis of the partial signal; and decoding the baseband signal by using the results of the determination.

According to another embodiment of the present invention, there is provided a receiving method including the steps of: receiving a wireless signal which is generated on the basis of any baseband signal from among a baseband signal having a predetermined frequency band, a baseband signal having the lower band gained by dividing the predetermined frequency band into two portions, and a baseband signal having the upper band gained by dividing the predetermined frequency band into two portions; carrying out a frequency conversion on the wireless signal so as to generate the baseband signal that has been digitalized at a predetermined sampling rate; inputting the baseband signal into a filter for sampling and outputting from the inputted signal a signal component of a frequency band having a bandwidth with approximately 0 Hz as the center frequency, which is gained by multiplying the sampling rate of the inputted signal by the ratio of the bandwidth of the predetermined frequency band to the predetermined sampling rate; thinning into half the sampling rate of the baseband signal that has been outputted from the filter; shifting the frequency band of the baseband signal of which the sampling rate has been thinned by such an amount of shift that the center frequency of the lower band or the center frequency of the upper band becomes approximately 0 Hz and inputting the resulting frequency band into the filter; determining on the basis of the baseband signal that has been outputted from the filter portion the frequency band of the baseband signal that has been generated on the basis of the wireless signal; and decoding the baseband signal by using the results of the determination.

According to the embodiments of the present invention described above, the frequency band of a baseband signal can be determined while simplifying the configuration.

BRIEF DESCRIPTION OF THE DRAWINGS

FIG. 3B is a diagram for illustrating a concrete example of a plus shift signal and a minus shift signal in lower 40 MHz mode;

FIG. 4 is a flow chart showing the flow of the receiving method used in the wireless communication apparatus according to the first embodiment;

FIG. 11 is a function block diagram showing the configuration of a wireless communication apparatus which relates to the present invention.

DETAILED DESCRIPTION OF THE PREFERRED EMBODIMENTS

Figure 1:
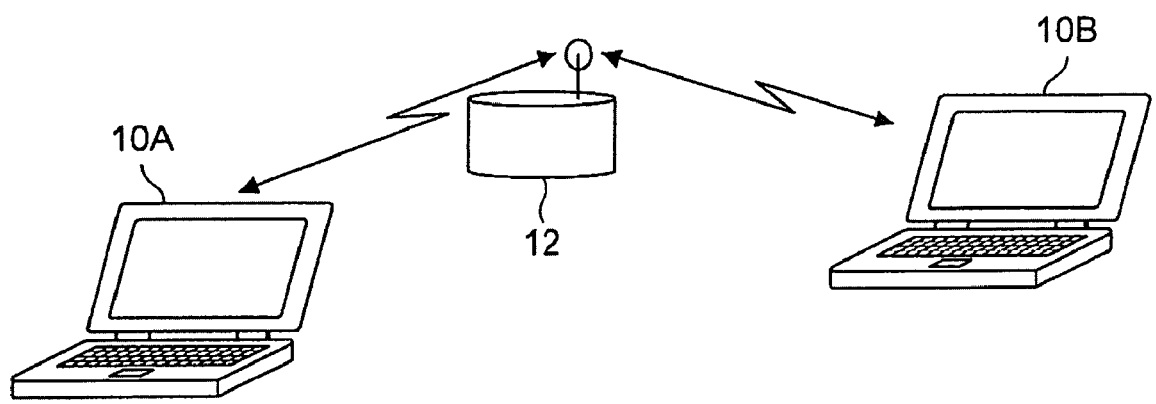
FIG. 1 is a diagram for illustrating an example of the configuration of a wireless communication system according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, "Best Mode for Carrying Out the Invention" will be described in the following order.

[1] Outline of wireless communication system according to one embodiment of present invention

[2] First embodiment of present invention

[2-1] Purpose of first embodiment of present invention

[2-2] Configuration of wireless communication apparatus according to first embodiment of present invention

[2-3] Receiving method used in wireless communication apparatus

[2-4] Modification of first embodiment of present invention

[3] Second Embodiment of present invention

[3-1] Configuration of wireless communication apparatus according to second embodiment of present invention

[3-2] Receiving method used in wireless communication apparatus

[3-3] Modification of second embodiment of present invention

[4] Conclusions

[1] Outline of Wireless Communication System According to One Embodiment of Present Invention First, the outline of the wireless communication system 1 according to one embodiment of the present invention is described with reference to FIG. 1.

FIG. 1 is a diagram for illustrating an example of the configuration of the wireless communication system 1 according to one embodiment of the present invention. As shown in FIG. 1, the wireless communication system 1 includes a wireless communication apparatus 10A, a wireless communication apparatus 10B and a base station 12. Here, in the present specification, in the case where it is not particularly necessary to differentiate between the wireless communication apparatus 10A and the wireless communication apparatus 10B, they are simply referred to as wireless communication apparatuses 10.

The base station 12 is an access point (AP) in a wireless LAN (local area network), for example, and the wireless communication apparatuses 10 included in the wireless communication system 1 relay transmitted/received signals. Here, as examples of the signals transmitted/received by the wireless communication apparatuses 10, music data, such as music, speeches or radio programs, image data, such as movies, television programs, video programs, photographs, documents, pictures and diagrams, other data, such as games or software, and other signals for controlling wireless communication can be cited.

The wireless communication apparatus 10A and the wireless communication apparatus 10B can transmit and receive signals via the base station 12. In addition, the wireless communication apparatuses 10 according to the present embodiment can carry out wireless communication in any of the band modes, from among 20 MHz mode using a bandwidth of 20 MHz, 40 MHz mode using a predetermined frequency band of which the bandwidth is 40 MHz, upper 40 MHz mode using a frequency band of 20 MHz which is the upper half of the 40 MHz (partial frequency band), and lower 40 MHz mode using a frequency band of 20 MHz which is the lower half of the 40 MHz (partial frequency band). Here, the center frequency in the baseband signals in the above-described 20 MHz mode and 40 MHz mode is approximately 0 MHz, and the center frequency in the wireless signal may be approximately 5 GHz.

Here, though FIG. 1 shows PC's (personal computers) as examples of wireless communication apparatuses 10 functioning as a receiving apparatuses, the wireless communication apparatuses 10 may be information processing apparatuses, for example image processing apparatuses for home use (DVD recorders, VCR's and the like) cellular phones, PHS's (personal handyphone systems), portable music reproducers, portable video processing apparatuses, PDA's (personal digital assistants), gaming devices for home use, portable gaming devices or other home electronics.

In addition, though FIG. 1 shows an example of a wireless communication system 1 in infrastructure mode, each of the wireless communication apparatuses 10 can autonomously carry out wireless communication in ad-hoc mode in a decentralized manner.

[2] First Embodiment of Present Invention

[2-1] Purpose of First Embodiment of Present Invention

In the above-described wireless communication system 1, it is necessary for the wireless communication apparatuses 10 to determine the appropriate band mode for the received signal and decode the received signal in accordance with a method corresponding to this band mode.

As a method for determining the band mode, a method for providing a receiving apparatus with two types of band pass filters for sampling signal components in frequency bands which correspond to upper 40 MHz mode and lower 40 MHz mode so that a wireless signal converted to a baseband signal can be inputted into each band pass filter can be cited. A wireless communication apparatus 30 for implementing this determination method is described with reference to FIG. 11.

FIG. 11 is a function block diagram showing the configuration of a wireless communication apparatus 30 which relates to the present invention. The wireless communication apparatus 30 includes an antenna 32, a high frequency processing portion 34, an A/D converting portion 36, a filter portion 40, a decimator 52, a decimator 54, a decimator 56, a determining portion 60, a decoding portion 62 and an application portion 64.

When the antenna 32 receives a wireless signal, the high frequency processing portion 34 converts the wireless signal into a baseband signal and the A/D converting portion 36 digitalizes the baseband signal. The filter portion 40 includes an upper filter 42 of which the pass band is a frequency band from 0 MHz to 20 MHz, a lower filter 44 of which the pass band is a frequency band from −20 MHz to 0 MHz, and a 40 MHz filter 46 of which the pass band is a frequency band from −20 MHz to 20 MHz.

Accordingly, the determining portion 60 can determine the band mode on the basis of signals outputted from the upper filter 42 and the lower filter 44. In the case where signals are outputted only from the upper filter 42, for example, the determining portion 60 determines that the band mode is upper 40 MHz mode, while in the case where signals are outputted only from the upper filter 44, the determining portion 60 determines that the band mode is lower 40 MHz mode. The decoding portion 62 decodes the signal outputted from the 40 MHz filter 46 on the basis of the band mode as determined by the determining portion 60 and outputs the resulting signal to the application portion.

It is necessary, however, for the wireless communication apparatus 30 to be provided with two types of band pass filters (42, 44) in order to determine the band mode. In addition, it is necessary for the band pass filter to be designed as a Hilbert filter in order to make −20 MHz to 0 MHz and 0 MHz to 20 MHz pass bands. As a result, an issue arises, such that the wireless communication apparatus 30 has a complicated configuration.

Thus, the wireless communication apparatus 10 according to the first embodiment of the present invention was created in view of the above. In the wireless communication apparatus 10 according to the present embodiment, the configuration of the filter for determining the band mode can be simplified. In the following, the configuration and the operation of this wireless communication apparatus 10 are described in detail.

Figure 2:
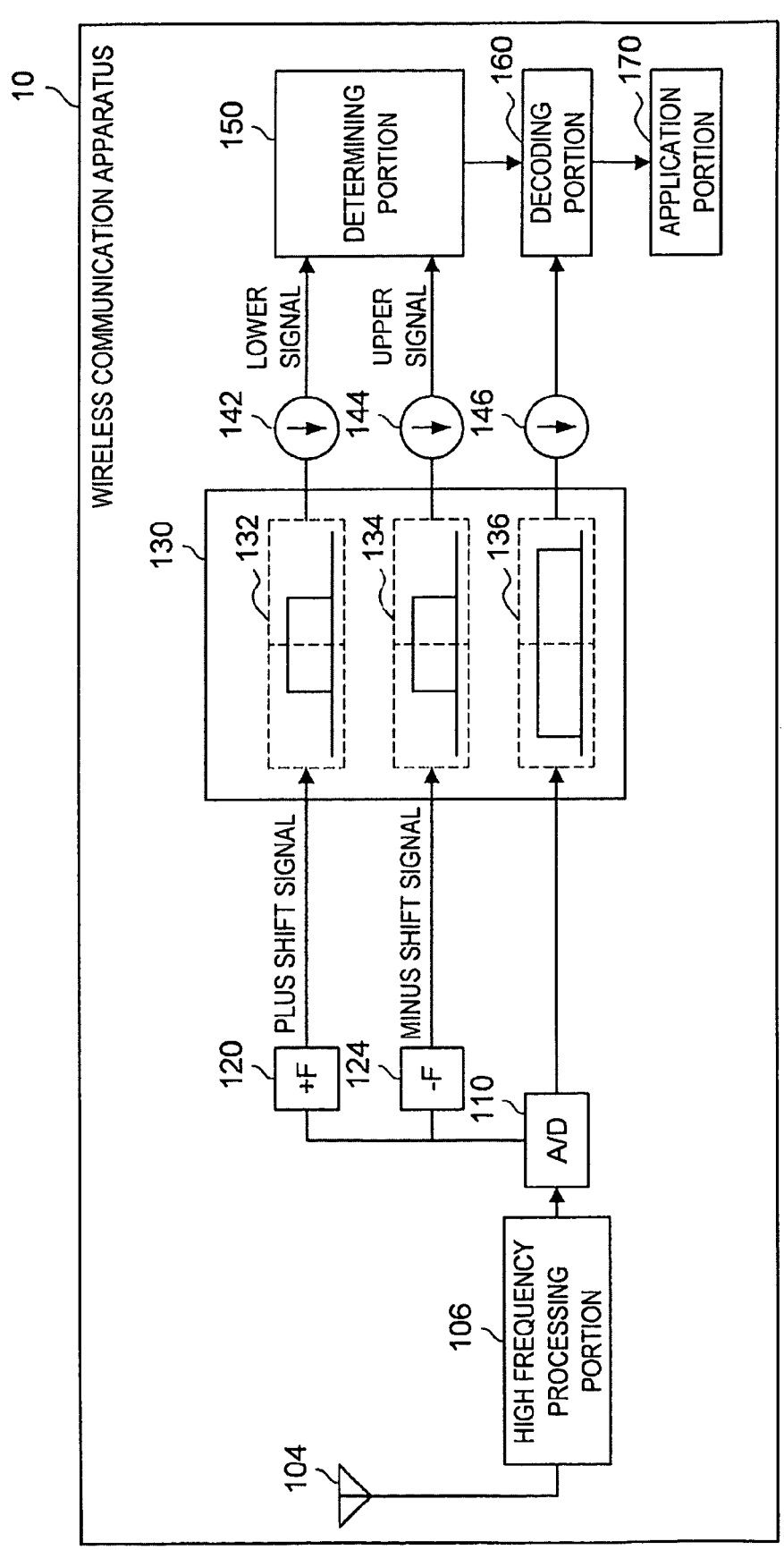
FIG. 2 is a function block diagram showing the configuration of a wireless communication apparatus according to the first embodiment of the present invention.

[2-2] Configuration of Wireless Communication Apparatus According to First Embodiment of Present Invention FIG. 2 is a function block diagram showing the configuration of the wireless communication apparatus 10 according to the present embodiment. The wireless communication apparatus 10 includes an antenna 104, a high frequency processing portion 106, an A/D converting portion 110, a plus shifter 120, a minus shifter 124, a filter portion 130, a decimator 142, a decimator 144, a decimator 146, a determining portion 150, a decoding portion 160 and an application portion 170.

The antenna portion 104 is an interface with another wireless communication apparatus 10B, and functions as a receiving portion for receiving wireless signals from another wireless communication apparatus 10B. The antenna 104 receives wireless signals (orthogonal frequency division multiplex signals) in 40 MHz mode, upper 40 MHz mode or lower 40 MHz mode in another wireless communication apparatus 10B.

The high frequency processing portion 106 functions as a signal processing portion which frequency converts (down converts) wireless signals received by the antenna 104 so as to generate an analog baseband signal (complex baseband signal). The A/D converting portion 110 converts the analog baseband signal generated by the high frequency portion 106 to digital at a sampling rate of, for example, 40 MHz.

The plus shifter 120 shifts the frequency band of the baseband signal that has been digitalized by the A/D converting portion 110 by such an amount of shift that the center frequency of the frequency band of the baseband signal in lower 40 MHz mode becomes approximately 0 MHz. That is to say, the plus shifter 120 generates a plus shift signal gained by shifting the frequency band of the baseband signal that has been digitalized by the A/D converting portion 110 to the plus side by 10 MHz, and inputs the plus shift signal into the filter portion 130. Here, the plus shifter 120 can shift the frequency band through the operation shown in the following Formula 1, for example, in the case where the sampling rate is 40 MHz.

[Formula 1]

$$x'_k = x_k e^{\frac{j\pi k}{2}} \quad \text{Formula 1}$$

In Formula 1, k represents a sample number inputted through the A/D converting portion 110, xk represents the kth input sample value, and x'k represents the output of the plus shifter 120.

The minus shifter 124 shifts the frequency band of the baseband signal that has been digitalized by the A/D converting portion 110 by such an amount of shift that the center frequency of the frequency band of the baseband signal in upper 40 MHz mode becomes approximately 0 MHz. That is to say, the minus shifter 124 generates a minus shift signal gained by shifting the frequency band of the baseband signal that has been digitalized by the A/D converting portion 110 to the minus side by 10 MHz, and inputs the minus shift signal into the filter portion 130. Here, the minus shifter 124 can shift the frequency band through the operation shown in the following Formula 2, for example, in the case where the sampling rate is 40 MHz.

[Formula 2]

$$x'_k = x_k e^{\frac{-j\pi k}{2}} \quad \text{Formula 2}$$

In Formula 2, k represents a sample number inputted through the A/D converting portion 110, xk represents the kth input sample value, and x"k represents the output of the minus shifter 124.

Here, concrete examples of the plus shift signal and the minus shift signal in the case where the band mode of the baseband signal that has been digitalized by the A/D converting portion 110 is 40 MHz mode, in the case where it is upper 40 MHz mode, and in the case where it is lower 40 MHz mode are described with reference to FIGS. 3A to 3C.

Figure 3A:
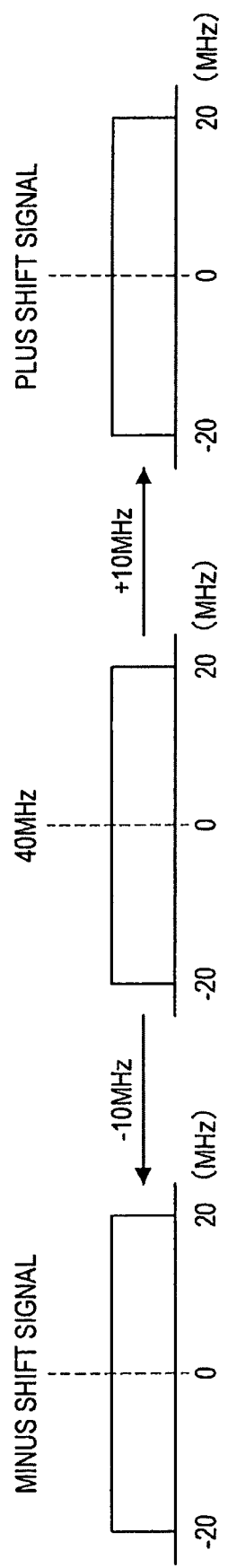
FIG. 3A is a diagram for illustrating a concrete example of a plus shift signal and a minus shift signal in 40 MHz mode.

FIG. 3A is a diagram illustrating a concrete example of a plus shift signal and a minus shift signal in 40 MHz mode. As shown in FIG. 3A, the baseband signal in 40 MHz mode has a signal component in the frequency band from −20 MHz to 20 MHz.

The plus shift signal gained when the plus shifter 120 plus shifts the frequency band of the baseband signal in 40 MHz mode by 10 MHz has a signal component in the frequency band from −20 MHz to 20 MHz, as does the baseband signal in 40 MHz mode. This is because the signal component from 10 MHz to 20 MHz of the baseband signal in 40 MHz mode becomes a signal component from −20 MHz to −10 MHz of the plus shift signal.

Likewise, the plus shift signal gained when the minus shifter 124 minus shifts the frequency band of the baseband signal in 40 MHz mode by 10 MHz also has a signal component in the frequency band from −20 MHz to 20 MHz. This is because the signal component from −20 MHz to −10 MHz of the baseband signal in 40 MHz mode becomes a signal component from 10 MHz to 20 MHz of the minus shift signal.

FIG. 3B is a diagram for illustrating a concrete example of a plus shift signal and a minus shift signal in lower 40 MHz mode. As shown in FIG. 3B, the baseband signal in lower 40 MHz mode has a signal component in the frequency band from −20 MHz to 0 MHz.

The plus shift signal gained when the plus shifter 120 plus shifts the frequency band of the baseband signal in lower 40 MHz mode by 10 MHz has a signal component in the frequency band from −10 MHz to 10 MHz.

In addition, the minus shift signal gained when the minus shifter 124 minus shifts the frequency band of the baseband signal in lower 40 MHz mode by 10 MHz has a signal component in the frequency band from −20 MHz to −10 MHz and in that from 10 MHz to 20 MHz. This is because the signal component from −20 MHz to −10 MHz of the baseband signal in lower 40 MHz mode becomes a signal component from 10 MHz to 20 MHz of the minus shift signal.

Figure 3C:
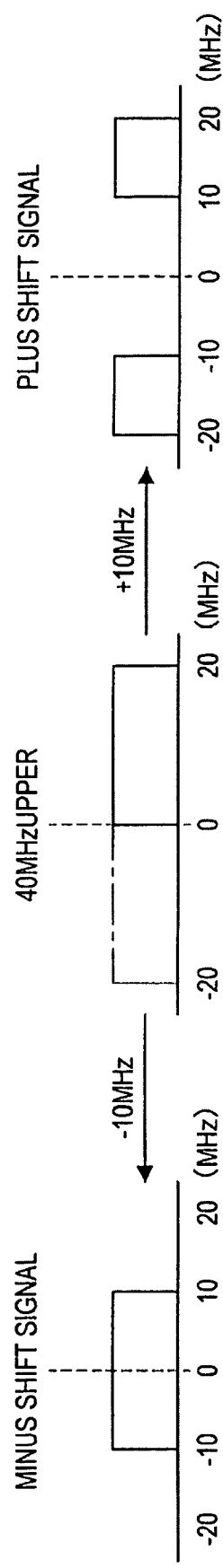
FIG. 3C is a diagram for illustrating a concrete example of a plus shift signal and a minus shift signal in upper 40 MHz mode.

FIG. 3C is a diagram for illustrating a concrete example of a plus shift signal and a minus shift signal in upper 40 MHz mode. As shown in FIG. 3C, the baseband signal in upper 40 MHz mode has a frequency component in the frequency band from 0 MHz to 20 MHz.

The plus shift signal gained when the plus shifter 120 plus shifts the frequency band of the baseband signal in upper 40 MHz mode by 10 MHz has a signal component in the frequency band from −20 MHz to −10 MHz and in that from 10 MHz to 20 MHz. This is because the signal component from 10 MHz to 20 MHz of the baseband signal in upper 40 MHz mode becomes a signal component from −20 MHz to −10 MHz of the plus shift signal.

In addition, the minus shift signal gained when the plus shifter 124 minus shifts the frequency band of the baseband signal in upper 40 MHz mode by 10 MHz has a signal component in the frequency band from −10 MHz to 10 MHz.

As described above, the plus shift signal in lower 40 MHz mode and the minus shift signal in 40 MHz mode have a signal component in the frequency band from −10 MHz to 10 MHz, and the minus shift signal in lower 40 MHz mode and the plus shift signal in 40 MHz mode do not have a signal component in the frequency band from −10 MHz to 10 MHz. In addition, the plus shifter 120 and the minus shifter 124 function as band shifters.

Returning to the description of the configuration of the wireless communication apparatus 10 with reference to FIG. 2, the filter portion 130 includes a 20 MHz filter 132, a 20 MHz filter 134 and a 40 MHz filter 136.

The 20 MHz filter 132 samples a signal component in the frequency band having the bandwidth of the baseband signal in lower 40 MHz mode with 0 MHz as the center frequency from the plus shift signal inputted through the plus shifter 120. That is to say, the 20 MHz filter 132 samples a signal component in the frequency band from −10 MHz to 10 MHz from the plus shift signal inputted through the plus shifter 120 and outputs the signal component as a lower signal.

Here, as shown in FIGS. 3A to 3C, plus shift signals which include a signal component in the frequency band from −10 MHz to 10 MHz are a plus shift signal in 40 MHz mode and lower 40 MHz mode. Accordingly, a lower signal is outputted in the case where the band mode is 40 MHz mode or lower 40 MHz mode.

The 20 MHz filter 134 samples a signal component in the frequency band having the bandwidth of the baseband signal in upper 40 MHz mode with 0 MHz as the center frequency from the minus shift signal inputted through the minus shifter 124. That is to say, the 20 MHz filter 134 samples a signal component in the frequency band from −10 MHz to 10 MHz from the minus shift signal inputted through the minus shifter 124 and outputs the signal component as an upper signal.

Here, as shown in FIGS. 3A to 3C, minus shift signals which include a signal component in the frequency band from −10 MHz to 10 MHz are a minus shift signal in 40 MHz mode and upper 40 MHz mode. Accordingly, an upper signal is outputted in the case where the band mode is 40 MHz mode or upper 40 MHz mode.

The 40 MHz filter 136 samples a signal component in the frequency band of the baseband signal in 40 MHz mode from the digital baseband signal outputted from the A/D converting portion 110. That is to say, the 40 MHz filter 136 samples a signal component in the frequency band from −20 MHz to 20 MHz from the digital baseband signal outputted from the A/D converting portion 110 and outputs the signal component as a 40 MHz signal.

The decimator 142 thins the sampling rate of the lower signal outputted from the 20 MHz filter 132 (to 20 MHz from 40 MHz, for example), the decimator 144 thins the sampling rate of the upper signal outputted from the 20 MHz filter 134 (to 20 MHz from 80 MHz, for example), and the decimator 146 thins the sampling rate of the 40 MHz signal outputted from the 40 MHz filter 136 (to 40 MHz from 80 MHz, for example).

The determining portion 150 determines the band mode on the basis of the signal outputted from the filter portion 130. In the case where only lower signals are outputted from the filter portion 130, for example, the determining portion 150 determines that the band mode is lower 40 MHz mode. In addition, in the case where only upper signals are outputted from the filter portion 130, the determining portion 150 determines that the band mode is upper 40 MHz mode. In addition, in the case where both upper signals and lower signals are outputted from the filter portion 130, the determining portion determines that the band mode is 40 MHz mode. The determining portion 150 may determine whether or not there are lower signals or upper signals on the basis of whether or not a preamble can be detected.

Here, the determining portion 150 may determine the band mode on the basis of the difference in the frequency offset, the timing and the SN ratio, which can be estimated from the upper signal or the lower signal, instead of whether or not there are upper signals or lower signals. The determining portion 150 may determine that the band mode is 40 MHz mode in the case where the difference in the frequency offset between the upper signal and the lower signal is within a set range, for example.

In addition, though FIG. 2 shows a case where an upper signal and a lower signal are inputted in the determining portion 150 in different series, the present embodiment is not limited to this example. For example, signals where an upper signal and a lower signal are alternately mixed for each sample may be inputted in the determining portion 150, and the determining portion 150 may determine the band mode on the basis of whether a preamble is detected from odd number samples or even number samples.

The decoding portion 160 decodes the 40 MHz signal outputted from the filter portion 130 in accordance with a method selected on the basis of the results of determination of the band mode by the determining portion 150. The decoding portion 160 can decode only the frequency band corresponding to the band mode determined by the determining portion 150. In addition, the decoding portion 160 may Fourier transform the entirety of the 40 MHz signal so as to decode only the subcarrier included in the corresponding frequency band.

In addition, in the case where the band mode is determined to be upper 40 MHz mode or lower 40 MHz mode, the decoding portion 160 may Fourier transform the upper signal or lower signal instead of the 40 MHz signal. Here, the application portion 170 may be a function block for carrying out a certain process or an externally connected apparatus.

[2-3] Receiving Method Used in Wireless Communication Apparatus

The configuration of the wireless communication apparatus 10 according to the first embodiment of the present invention is described above. Next, a receiving method used in the wireless communication apparatus 10 is described with reference to FIG. 4.

FIG. 4 is a flow chart showing the flow of the receiving method used in the wireless communication apparatus 10. First, when the antenna 104 of the wireless communication apparatus 10 receives a wireless signal (S204), the high frequency processing portion 106 generates a baseband signal from the wireless signal (S208).

Next, the plus shifter 120 outputs a plus shift signal gained by shifting the frequency band of the baseband signal generated by the high frequency processing portion 106 to the plus side by 10 MHz, and the minus shifter 124 outputs a minus shift signal gained by shifting the frequency band of the baseband signal generated by the high frequency processing portion 106 to the minus side by 10 MHz (S212).

After that, the 20 MHz filter 132 samples a signal component in the frequency band from −10 MHz to 10 MHz from the plus shift signal and outputs the signal component as a lower signal, while the 20 MHz filter 134 samples a signal component in the frequency band from −10 MHz to 10 MHz from the minus shift signal and outputs the signal component as an upper signal (S216).

Then, the determining portion 150 determines whether or not an upper signal has been outputted from the filter portion 130 (S220). In the case where it is determined that an upper signal has been outputted from the filter portion 130, the determining portion 150 further determines whether or not a lower signal has been outputted from the filter portion 130 (S224). In the case where a lower signal has also been outputted from the filter portion 130, the determining portion 150 determines that the band mode is 40 MHz mode (S228). In the case where no lower signal has been outputted from the filter portion 130, the determining portion 150 determines that the band mode is upper 40 MHz mode (S232).

Meanwhile, in the case where it is determined that no upper signal has been outputted from the filter portion 130 in S220, the determining portion 150 determines that the band mode is lower 40 MHz mode (S236). After that, the decoding portion 160 decodes the baseband signal on the basis of the band mode as determined by the determining portion 150 (S240).

As described above, in the wireless communication apparatus 10 according to the first embodiment of the present invention, the respective filters 132 to 136 can simply be formed of filters which sample only a positive frequency component or a negative frequency component. Accordingly, it is possible for the wireless communication apparatus 10 to determine the band mode of the received wireless signal while simplifying the configuration of the filter portion 130.

[2-4] Modification of First Embodiment of Present Invention

Next, a modification of the wireless communication apparatus 10 according to the present embodiment is described. The wireless communication apparatus 10 is advantageous in that the number of filters provided can be reduced. In the following, the wireless communication apparatus 10 is described with reference to FIG. 5.

Figure 5:
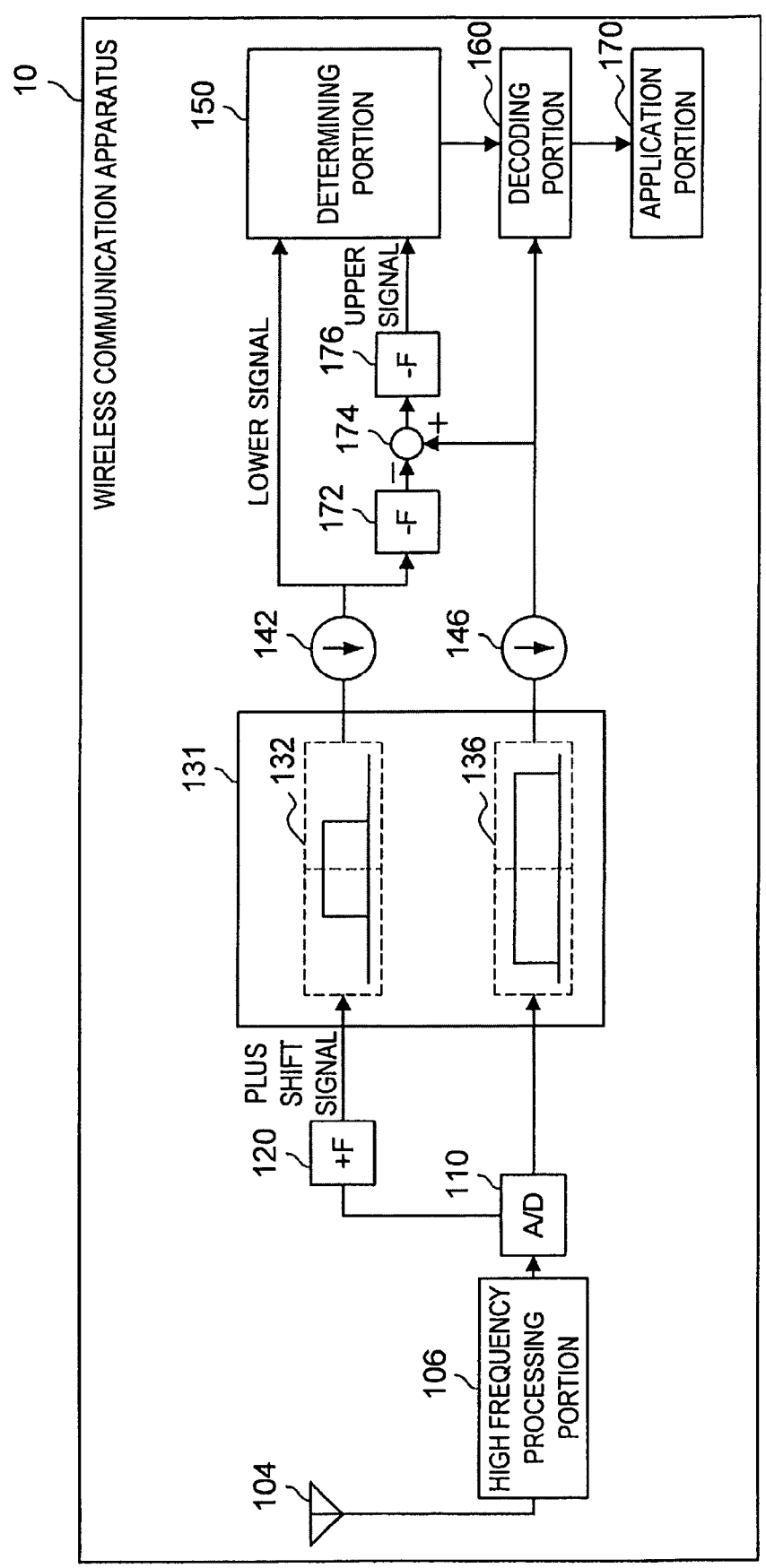
FIG. 5 is a diagram for illustrating a modification of the wireless communication apparatus according to the first embodiment.

FIG. 5 is a diagram for illustrating a modification of the wireless communication apparatus 10 according to the first embodiment of the present invention. The wireless communication apparatus 10 includes an antenna 104, a high frequency processing portion 106, an A/D converting portion 110, a plus shifter 120, a filter portion 131, a decimator 142, a decimator 146, a determining portion 150, a decoding portion 160, an application portion 170, a minus shifter 172, a subtracting portion 174 and a minus shifter 176. The configuration of the antenna 104, the high frequency processing portion 106, the A/D converting portion 110, the plus shifter 120, the determining portion 150, the decoding portion 160 and the application portion 170 is substantially the same as in the above description "[2-2] Configuration of wireless communication apparatus according to first embodiment of present invention," and therefore, the description thereof is omitted.

The filter portion 131 includes a 20 MHz filter 132 and a 40 MHz filter 136. The 20 MHz filter 132 samples a signal component in the frequency band from −10 MHz to 10 MHz from the plus shift signal outputted from the plus shifter 120 and outputs the signal component as a lower signal.

The minus shifter 172 shifts the frequency band of the lower signal outputted from the 20 MHz filter 132 by the frequency band shifted by the plus shifter 120 in the minus direction. That is to say, the minus shifter 172 functions as a rear stage shifter which shifts the frequency band of the lower signal outputted from the 20 MHz filter 132 to the minus side by 10 MHz.

The subtracting portion 174 subtracts the lower signal of which the frequency band has been minus shifted by the minus shifter 172 from the 40 MHz signal outputted from the 40 MHz filter 136. As a result, the subtracting portion 174 can calculate the signal component included in the frequency band from 0 MHz to 20 MHz in the 40 MHz signal as an upper signal. The minus shifter 176 shifts the frequency band of the upper signal calculated by the subtracting portion 174 to the minus side by 10 MHz and outputs the resulting frequency band to the determining portion 150.

The determining portion 150 can determine the band mode in accordance with the method described in the above "[2-2] Configuration of wireless communication apparatus according to first embodiment of present invention" on the basis of whether or not there is an input of a lower signal or an upper signal.

In this manner, it is possible for the wireless communication apparatus 10 to determine the band mode while limiting the number of filters provided in the filter portion 131 to two.

[3] Second Embodiment of Present Invention

Next, the second embodiment of the present invention is described. It is necessary for the wireless communication apparatus 10 according to the first embodiment of the present invention to be provided with filters having a number of different properties in the filter portion 130. The wireless communication apparatus 14 according to the present embodiment can determine the band mode even in the case where the filters provided are only filters having one property. In the following, the configuration and the operation of this wireless communication apparatus 14 are described in detail.

Figure 6:
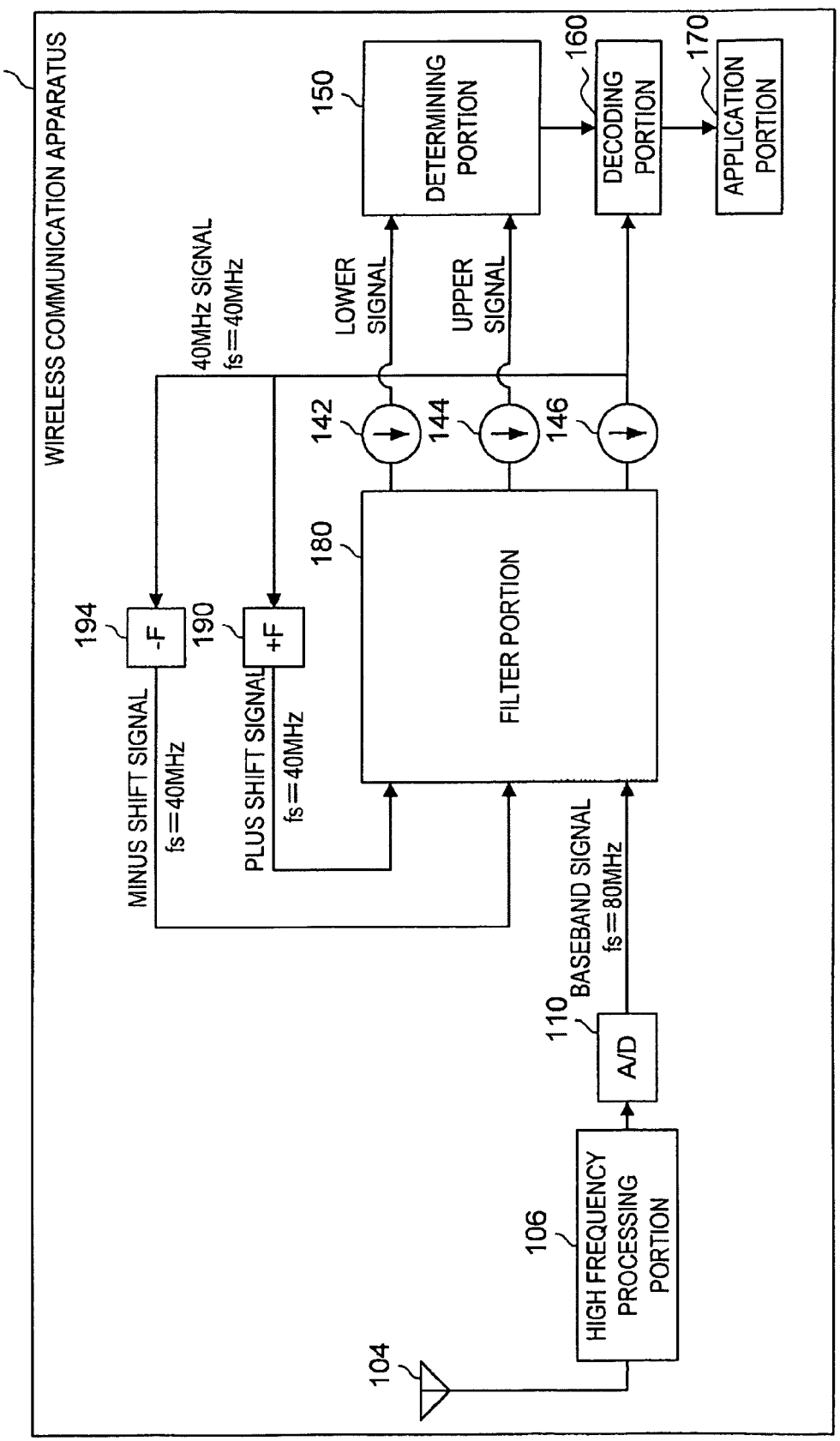
FIG. 6 is a function block diagram showing the configuration of the wireless communication apparatus according to a second embodiment of the present invention.

[3-1] Configuration of Wireless Communication Apparatus According to Second Embodiment of Present Invention FIG. 6 is a function block diagram showing the configuration of the wireless communication apparatus 14 according to the present embodiment. The wireless communication apparatus 14 includes an antenna 104, a high frequency processing portion 106, an A/D converting portion 110, a decimator 142, a decimator 144, a decimator 146, a determining portion 150, a decoding portion 160, an application portion 170, a filter portion 180, a plus shifter 190 and a minus shifter 194. The configuration of the antenna 104, the high frequency processing portion 106, the determining portion 150, the decoding portion 160 and the application portion 170 is substantially the same as in the above description "[2-2] Configuration of wireless communication apparatus according to first embodiment present invention," and therefore, detailed description thereof is omitted.

The A/D converting portion 110 digitalizes the baseband signal generated by the high frequency processing portion 106 at a predetermined sampling rate (for example 80 MHz). The A/D converting portion 110 cooperates with the high frequency processing portion 106 and functions as a signal processing portion.

The filter portion 180 samples a signal component in the frequency band having a bandwidth gained by multiplying the sampling rate of the inputted signal and the ratio of 40 MHz to the sampling rate by means of the A/D converting portion 110 with approximately 0 MHz as the center frequency from the inputted signal and outputs the signal component. Accordingly, the filter portion 180 samples a signal component in the frequency band having a bandwidth of 40 MHz gained by multiplying fs 80 MHz by ½ with approximately 0 MHz as the center frequency and outputs the signal component as a 40 MHz signal in the case where a baseband signal of fs (sampling rate) 80 MHz is inputted through the A/D converting portion 110.

The decimator 146 functions as a thinning portion which thins the sampling rate of the 40 MHz signal outputted from the filter portion 180 to half, that is to say, thins the sampling rate to 40 MHz.

The plus shifter 190 shifts the frequency band of the 40 MHz signal by such an amount of shift that the center frequency of the frequency band of the baseband signal in lower 40 MHz mode becomes approximately 0 MHz. That is to say, the plus shifter 190 generates a plus shift signal gained by shifting the frequency band of the 40 MHz signal to the plus side by 10 MHz and inputs the plus shift signal into the filter portion 180. Here, the plus shifter 190 can shift the frequency band through the operation shown in the above Formula 1, for example, in the case where the sampling rate is 40 MHz.

The minus shifter 194 shifts the frequency band of the 40 MHz signal by such an amount of shift that the center frequency of the frequency band of the baseband signal in upper 40 MHz mode becomes approximately 0 MHz. That is to say, the minus shifter 194 generates a minus shift signal gained by shifting the frequency band of the 40 MHz signal to the minus side by 10 MHz and inputs the minus shift signal into the filter portion 180. Here, the minus shifter 194 can shift the frequency band through the operation shown in the above Formula 2, for example, in the case where the sampling rate is 40 MHz.

The filter portion 180 samples a signal component from −10 MHz to 10 MHz from the plus shift signal inputted through the plus shifter 190 and outputs the signal component as a lower signal. In addition, a signal component from −10 MHz to 10 MHz is sampled from the minus shift signal inputted through the minus shifter 194 and outputs the signal component as an upper signal. The filter portion 180 makes it possible to sample a lower signal, an upper signal and a 40 MHz signal using the same configuration, as described above. In the following, the configuration of this filter portion 180 is described with reference to FIG. 7.

Figure 7:
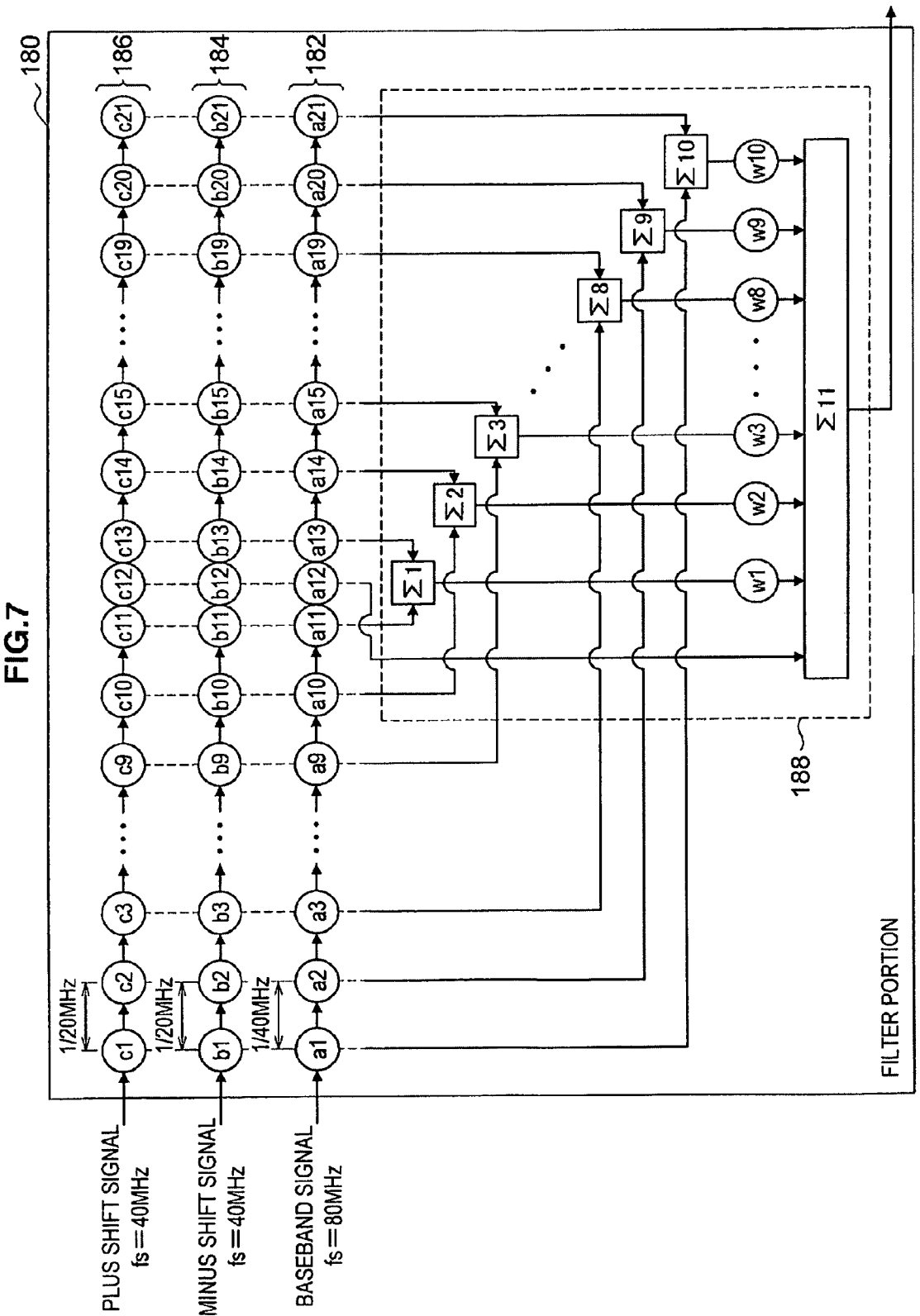
FIG. 7 is a diagram for illustrating the configuration of the filter portion in detail.
Figure 8:
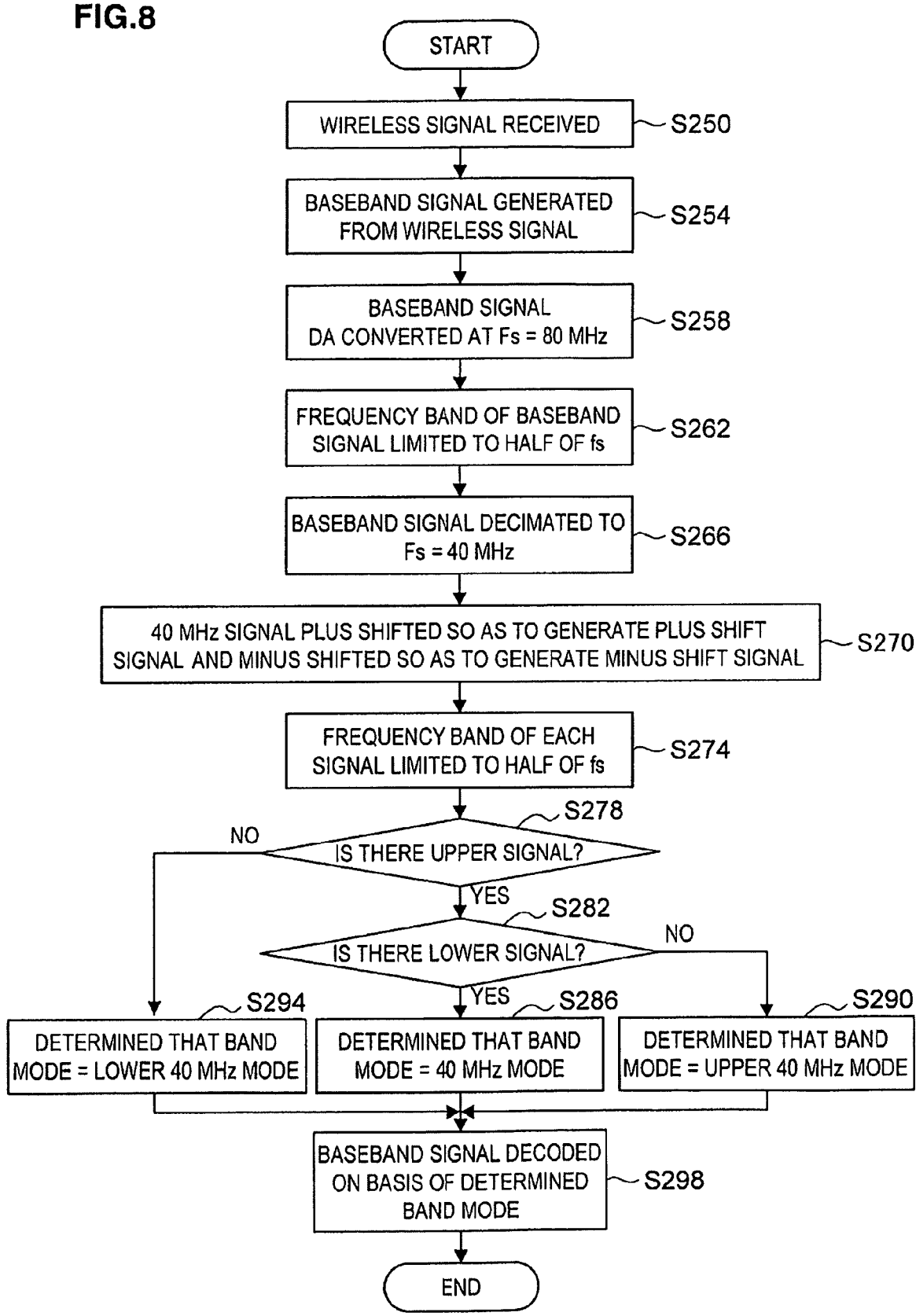
FIG. 8 is a flow chart showing the flow of the receiving method used in the wireless communication apparatus according to the second embodiment.
Figure 9:
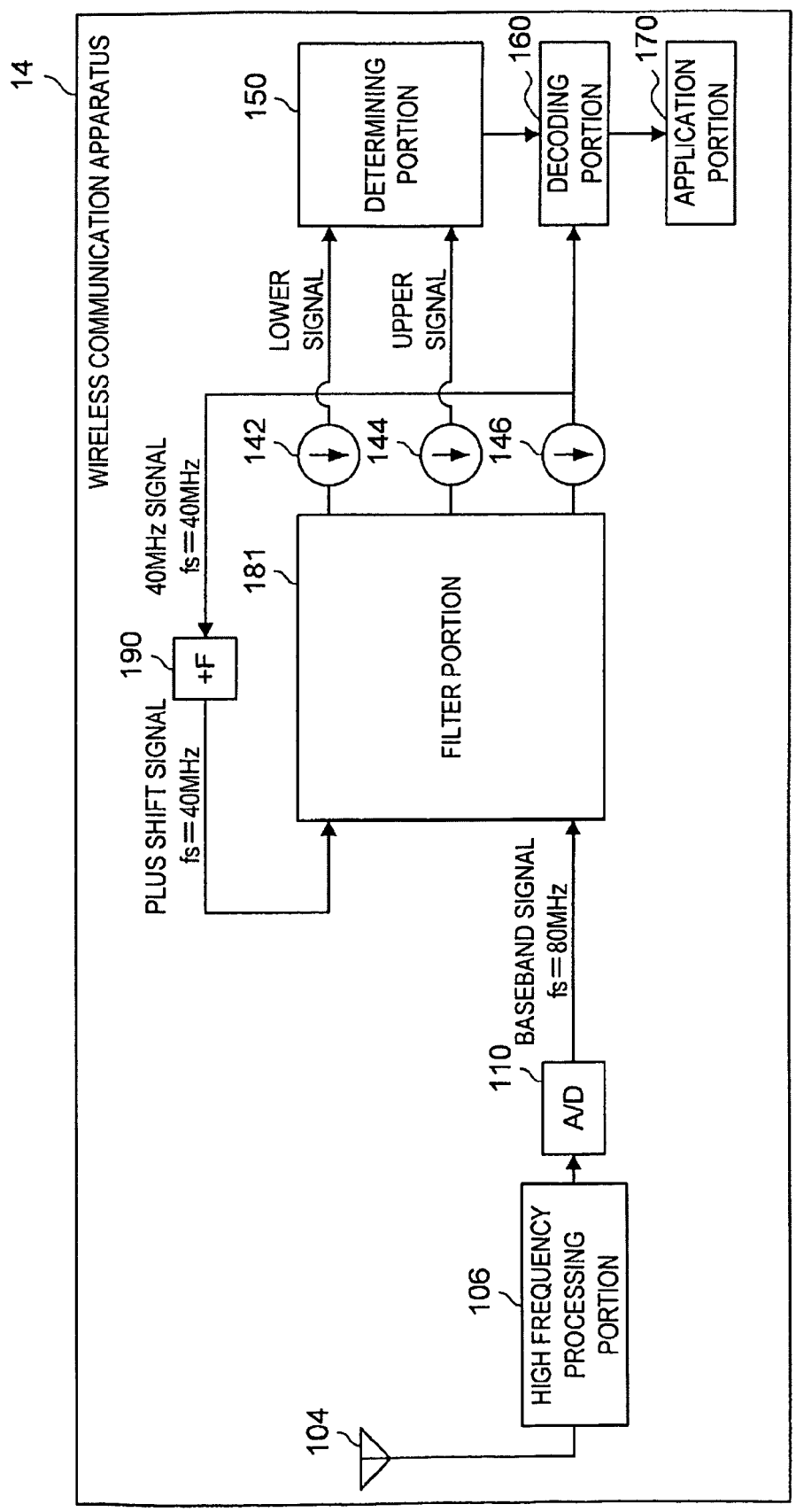
FIG. 9 is a function block diagram showing the configuration of the wireless communication apparatus according to a modification of the second embodiment.
Figure 10:
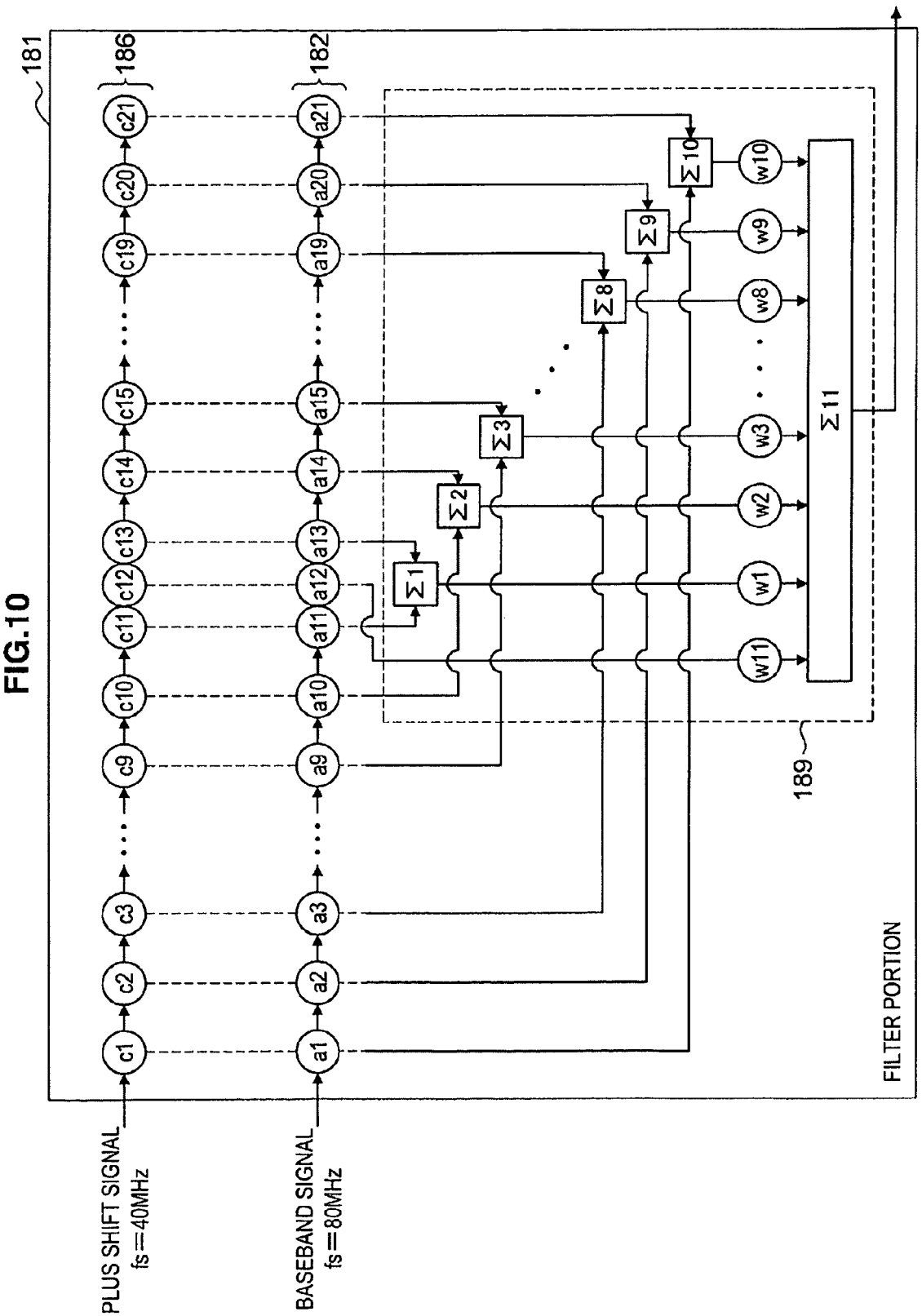
FIG. 10 is a diagram for illustrating the configuration of the filter portion.

FIG. 7 is a diagram for illustrating the configuration of the filter portion 180 in detail. As shown in FIG. 7, the filter portion 180 includes a first register group 182, a second register group 184, a third register group 186 and a calculating portion 188.

The first register group 182 includes registers a1 to a21 for holding sample values of the baseband signal outputted from the A/D converting portion 110. The sample value held by the register an is a sample value two samples before (¼₀ MHz before) the sample value held by the register an−1 (one sample before (⅛₀ MHz before) in the case of a12 and a13). Here, the first register group 182 actually holds all of the sample values of the inputted baseband signal at least until the center register a12 is passed.

The second register group 184 includes registers b1 to b21 for holding sample values of the minus shift signal outputted from the minus shifter 194. The sample value held by the register bn is a sample value two samples before (½₀ MHz before) the sample value held by the register bn−1 (one sample before (¼₀ MHz before) in the case of b12 and b13). Here, the second register group 184 actually holds all of the sample values of the inputted minus shift signal at least until the center register b12 is passed.

The third register group 186 includes registers c1 to c21 for holding sample values of the plus shift signal outputted from the plus shifter 190. The sample value held by the register cn is a sample value two samples before (½₀ MHz before) the sample value held by the register cn−1 (one sample before (¼₀ MHz before) in the case of c12 and c13). Here, the third register group 186 actually holds all of the sample values of the inputted minus shift signal at least until the center register c12 is passed.

The calculating portion 188 includes adding portions $\Sigma 1$ to 11 and weighing portions w1 to w10. As described above, in order to limit the bandwidth to half of the sampling rate of the inputted signal, weight given to the respective sample values of the inputted signal is made approximately 0 for every other sample. Accordingly, no issue arises when the respective register groups hold the inputted sample value for every other sample as described above.

In addition, an FIR filter where the weight given to the respective sample values of the inputted signal is symmetrical between the left and the right can be used as a filter for limiting the bandwidth to half of the sampling rate of the inputted signal. Accordingly, the adding portions $\Sigma 1$ to 10 add the sample values held in the registers in symmetrical locations in between the left and the right with the center register where the same weight is given at the center. For example, $\Sigma 1$ adds up the sample values held in a11 and a13, and $\Sigma 10$ adds up the sample values held in a1 and a21.

In addition, the adding portions $\Sigma 1$ to 10 switch the register groups which become the object of addition in sequence. In the case where the adding portions $\Sigma 1$ to 10 operate on the basis of a reference clock of 80 MHz, for example, the object of addition may be switched to such a sequence that a1 to a21 included in the first register group 182 are the object of addition in the nth clock, b1 to b21 included in the second register group 184 are the object of addition in the (n+1)th clock, a1 to a21 included in the first register group 182 are the object of addition in the (n+2)th clock, and c1 to c21 included in the third register group 186 are the object of addition in the (n+3)th clock.

FIG. 7 shows the manner in which the adding portions $\Sigma 1$ to 10 acquire sample values from the first register group 182, the second register group 184 and the third register group 186 as described above with dotted lines. Here, the reference clock is not limited to 80 MHz, and it may be 160 MHz or 320 MHz.

The weighing portions w1 to w10 weigh each of the sample values added by the adding portions $\Sigma 1$ to 10 (multiply by a tap coefficient), and $\Sigma 11$ sums up the respective sample values that are weighed by the weighing portions w1 to w10 and outputs the resulting value as a 40 MHz signal, an upper signal or a lower signal. In the case where the adding portions $\Sigma 1$ to $10$ have a1 to a21 included in the first register group $182$ as the object of addition, for example, $\Sigma 11$ outputs a 40 MHz signal. In addition, in the case where the adding portions $\Sigma 1$ to $10$ have b1 to b21 included in the second register group $184$ as the object of addition, $\Sigma 11$ outputs an upper signal, and in the case where the adding portions $\Sigma 1$ to $10$ have c1 to c21 included in the third register group $186$ as the object of addition, $\Sigma 11$ outputs a lower signal.

Assuming that the sampling rate of the output from the filter portion $180$ is decimated into half by the decimators $142$ to $146$, it becomes possible to alternately use the calculating portion $188$ for the output of a 40 MHz signal, an upper signal and a lower signal, as described above. In addition, in the case where a baseband signal of fs 80 MHz is inputted in the filter portion $180$, the filter portion $180$ outputs a 40 MHz signal of fs 40 MHz gained by sampling a signal component in the frequency band from −20 MHz to 20 MHz from the baseband signal, and therefore, it can be understood that the filter portion $180$ functions as a thinning portion.

Determination of the band mode, the decoding method and the like on the basis of the upper signal and the lower signal outputted from the filter portion $180$ is substantially the same as in the above description "[2-2] Configuration of wireless communication apparatus according to first embodiment of present invention," and therefore, detailed description thereof is omitted.

[3-2] Receiving Method Used in Wireless Communication Apparatus

The configuration of the wireless communication apparatus $14$ according to the second embodiment of the present invention is described above. Next, the receiving method used in this wireless communication apparatus $14$ is described with reference to FIG. $8$.

FIG. $8$ is a flow chart showing the flow of the receiving method used in the wireless communication apparatus $14$ according to the present embodiment. First, when the antenna $104$ of the wireless communication apparatus $14$ receives a wireless signal (S250), the high frequency processing portion $106$ generates a baseband signal from the wireless signal (S254). Next, the A/D converting portion $110$ digitalizes the baseband signal at a sampling rate of 80 MHz (S258).

Then, the filter portion $180$ outputs a 40 MHz signal gained by limiting the frequency band of the baseband signal outputted from the A/D converting portion $110$ to the frequency band from −20 MHz to 20 MHz having a bandwidth which is half of fs 80 MHz (S262). In addition, the filter portion $180$ thins the sampling rate of the baseband signal into 40 MHz, which is half (S266).

After that, the plus shifter $190$ shifts the frequency band of the 40 MHz signal to the plus side by 10 MHz and thus generates a plus shift signal, while the minus shifter $194$ shifts the frequency band of the 40 MHz signal to the minus side by 10 MHz and thus generates a minus shift signal (S270). Then, the filter portion $180$ limits the frequency band of the plus shift signal and the minus shift signal of fs 40 MHz to the frequency band from −10 MHz to 10 MHz having a bandwidth which is half of fs 40 MHz (S274).

Then, the determining portion $150$ determines whether or not an upper signal has been outputted from the filter portion $180$ (S278). In the case where it is determined that an upper signal has been outputted from the filter portion $180$, the determining portion $150$ further determines whether or not a lower signal has been outputted from the filter portion $180$ (S282). In the case where it is determined that a lower signal has also been outputted from the filter portion $180$, the determining portion $150$ determines that the band mode is 40 MHz mode (S286). In the case where no lower signal has been outputted from the filter portion $180$, the determining portion $150$ determines that the band mode is upper 40 MHz mode (S290).

Meanwhile, in the case where it is determined in S278 that no upper signal has been outputted from the filter portion $180$, the determining portion $150$ determines that the band mode is lower 40 MHz mode (S294). After that, the decoding portion $160$ decodes the baseband signal on the basis of the band mode as determined by the determining portion $150$ (S298).

As described above, the wireless communication apparatus $14$ according to the second embodiment of the present invention can determine the band mode simply with filter portion $180$ where the provided filters have one property.

[3-3] Modification of Second Embodiment of Present Invention

Next, a modification of the second embodiment of the present invention is described. The wireless communication apparatus $14$ according to the modification can output an upper signal without any input of a minus shift signal in the filter portion $181$. In the following, the wireless communication apparatus $14$ is described with reference to FIGS. $9$ and $10$.

FIG. $9$ is a function block diagram showing the configuration of the wireless communication apparatus $14$ according to the modification of the second embodiment of the present invention. The wireless communication apparatus $14$ includes an antenna $104$, a high frequency processing portion $106$, an A/D converting portion $110$, a decimator $142$, a decimator $144$, a decimator $146$, a determining portion $150$, a decoding portion $160$, an application portion $170$, a filter portion $181$ and a plus shifter $190$.

Thus, though the wireless communication apparatus $14$ does not include a minus shifter for minus shifting 40 MHz signals, the filter portion $181$ can output an upper signal. That is to say, the filter portion $181$ can output both a lower signal and an upper signal on the basis of the plus shift signal outputted from the plus shifter $190$. The configuration of this filter portion $181$ is described with reference to FIG. $10$.

FIG. $10$ is a diagram for illustrating the configuration of the filter portion $181$. The filter portion $181$ has many components in common with the filter portion $181$ described with reference to FIG. $7$, and therefore, it is described with emphasis on portions which are different.

The filter portion $181$ includes a first register group $182$, a third register group $186$ and a calculating portion $189$. The calculating portion $189$ includes adding portions $\Sigma 1$ to $11$ and weighing portions w1 to $10$.

The adding portions $\Sigma 1$ to $10$ switch the register groups which are the object of addition in sequence. In the case where the adding portions $\Sigma 1$ to $10$ operate on the basis of the reference clock of 80 MHz, for example, a1 to a21 included in the first register group $182$ are the object of addition for odd number clocks and c1 to c21 included in the third register group $186$ are the object of addition for even number clocks.

The weighing portions w1 to $10$ weigh the sample value added by the adding portions $\Sigma 1$ to $10$ in the same manner every time. Meanwhile, the weight given to the sample value of the center register c11 in the third register group $186$ by the weighing portion w11 is switched every time the adding portions $\Sigma 1$ to $10$ have the third register group $186$ as the object of addition. The weight given by the weighing portion w11 may be switched between "1" and "−1," for example.

Concretely, in the case where the adding portions $\Sigma 1$ to $10$ have the third register group $186$ as the object of addition for even number clocks, the weighing portion w11 alternately switches the weight given to the sample value of the register c11 between positive and negative for even number clocks.

In this configuration, upper signals and lower signals can be alternately outputted for even number clocks from the adding portion Σ11 which sum up the sample values to which weight has been added by the weighing portions w1 to 11.

[4] Conclusions

As described above, in the wireless communication apparatus 10 according to the first embodiment of the present invention, the filter portion 130 outputs upper signals and lower signals gained by sampling a signal component from −10 MHz to 10 MHz from the plus shift signal and the minus shift signal of which the frequency band has been shifted by such an amount of shift that the center frequency of the frequency band from −20 MHz to 0 MHz and from 0 MHz to 20 MHz becomes approximately 0 Hz.

Accordingly, the determining portion 150 can determine the band mode on the basis of whether or not an upper signal or a lower signal has been outputted from the filter portion 130. In addition, the filter for sampling the frequency band, for example from −10 MHz to 10 MHz, with 0 MHz as the center frequency can be formed simply of filters for sampling only a positive frequency component or a negative frequency component. That is to say, it is possible for the wireless communication apparatus 10 to determine the band mode while simplifying the configuration of the filter portion 130.

In addition, according to the modification of the first embodiment of the present invention, a minus shifter 172 and a subtracting portion 174 are provided in the rear stage of the filter portion 131 of the wireless communication apparatus 10, and thus, the number of filters for the filter portion 131 can be reduced.

In addition, the wireless communication apparatus 14 according to the first embodiment of the present invention can allow the calculating portion 188 of the filter portion 180 to operate while switching it to processing for signals in different series, and therefore, it is possible to further downsize the scale of the hardware of the filter portion 180.

It should be understood by those skilled in the art that various modifications, combinations, sub-combinations and alterations may occur depending on design requirements and other factors insofar as they are within the scope of the appended claims or the equivalents thereof.

For example, it is not necessary to process the respective steps in the process of the wireless communication apparatuses 10 and 14 in the present specification in chronological order following the order described in the flow chart, and processes where the steps are carried out in parallel or individually (parallel process or object process, for example) may be included.

In addition, it is possible to create a computer program allowing such hardware as CPU's, ROM's and RAM's incorporated in the wireless communication apparatus 10 or 14 to function in the same manner as the above-described respective components in the wireless communication apparatus 10 or 14. In addition, a storage medium where such a computer program is stored can also be provided. In addition, the respective function blocks shown in the function block diagrams of FIGS. 2, 5, 6 and 9 can be formed as hardware, and thus, sequential processes can be carried out in hardware.

What is claimed is:

1. A receiving apparatus comprising:
a receiving portion for receiving a wireless signal generated on the basis of a baseband signal having either a predetermined frequency band or a baseband signal having any of partial frequency bands gained by dividing the predetermined frequency band into a number of portions;
a signal processing portion for carrying out a frequency conversion on the wireless signal received by the receiving portion so as to generate the baseband signal;
a band shifter for shifting the frequency band of the baseband signal by such an amount of shift that the center frequency of at least a specific partial frequency band is in the vicinity of 0 Hz;
a filter portion for outputting a partial signal, which is gained by sampling a signal component of the frequency band having a bandwidth of the specific partial frequency band with approximately 0 Hz as the center frequency, from the baseband signal of which the frequency band has been shifted by the band shifter;
a determining portion for determining the frequency band of the baseband signal on the basis of the partial signal outputted from the filter portion; and
a decoding portion for decoding the baseband signal by using the results of determination by the determining portion.

2. The receiving apparatus according to claim 1, wherein
the partial frequency band includes a lower band or an upper band, which are gained by dividing the predetermined frequency band into two portions,
the band shifter shifts the frequency band of the baseband signal by such an amount of shift that the center frequency of a specific partial frequency band of either the lower band or the upper band becomes approximately 0 Hz,
the filter portion outputs a partial signal, which is gained by sampling a signal component in the frequency band having a bandwidth of the specific partial frequency band with approximately 0 Hz as the center frequency, and the entire signal, which is gained by sampling a signal component of the predetermined frequency band, from the baseband signal of which the frequency band has been shifted by the band shifter, and comprises:
a rear stage shifter for shifting the frequency band of the partial signal that has been outputted from the filter portion by the amount of shift towards the opposite side as the band shifter; and
a subtracting portion for subtracting the partial signal of which the frequency band has been shifted by the rear stage shifter from the entire signal that has been outputted from the filter portion, and
the determining portion determines the frequency band of the baseband signal on the basis of the partial signal outputted from the filter portion and the signal which is gained through subtraction by the subtracting portion.

3. A receiving apparatus comprising:
a receiving portion for receiving a wireless signal which is generated on the basis of any baseband signal from among a baseband signal having a predetermined frequency band, a baseband signal having the lower band gained by dividing the predetermined frequency band into two portions, and a baseband signal having the upper band gained by dividing the predetermined frequency band into two equal portions;
a signal processing portion for carrying out a frequency conversion on the wireless signal received by the receiving portion so as to generate the baseband signal that has been digitalized at a predetermined sampling rate;
a filter portion for sampling and outputting from the inputted signal a signal component of a frequency band having a bandwidth with approximately 0 Hz as the center frequency, which is gained by multiplying the sampling rate of the inputted signal by the ratio of the bandwidth of the predetermined frequency band to the predetermined sampling rate;

a thinning portion for thinning into half the sampling rate of the baseband signal that has been inputted from the signal processing portion into the filter portion and outputted from the filter portion;

a band shifter for shifting the frequency band of the baseband signal of which the sampling rate has been thinned by the thinning portion by such an amount of shift that the center frequency of the lower band or the center frequency of the upper band becomes approximately 0 Hz and inputting the resulting frequency band into the filter portion;

a determining portion for determining the frequency band of the baseband signal that has been generated by the signal processing portion on the basis of the baseband signal that has been inputted from the band shifter into the filter portion and outputted from the filter portion; and a decoding portion for decoding the baseband signal by using the results of determination by the determining portion.

4. The receiving apparatus according to claim 3, wherein the filter portion comprises:

a first register group for holding the sample values of baseband signals inputted from the signal processing portion in chronological sequence;

a second register group for holding the sample values of baseband signals inputted from the band shifter in chronological sequence; and a calculating portion for carrying out weighing addition, according to which weight is given to each sample value held in the first register group or the second register group and the respective sample values are added up, and then, outputting the resulting value to the thinning portion or the determining portion, and the calculating portion alternately carries out weighing addition of each sample value held in the first register group and weighing addition of each sample value held in the second register group in sequence.

5. The receiving apparatus according to claim 4, wherein the calculating portion switches between the positive and the negative of the weight added to the sample value held in the register at the center of the second register group every time weighing addition is carried out on each sample value held in the second register group.

6. A program for allowing a computer to function as a receiving apparatus, comprising:

a receiving portion for receiving a wireless signal generated on the basis of a baseband signal having either a predetermined frequency band or a baseband signal having any of partial frequency bands gained by dividing the predetermined frequency band into a number of portions;

a signal processing portion for carrying out a frequency conversion on the wireless signal received by the receiving portion so as to generate the baseband signal;

a band shifter for shifting the frequency band of the baseband signal by such an amount of shift that the center frequency of at least a specific partial frequency band is in the vicinity of 0 Hz;

a filter portion for outputting a partial signal, which is gained by sampling a signal component of the frequency band having a bandwidth of the specific partial frequency band with approximately 0 Hz as the center frequency, from the baseband signal of which the frequency band has been shifted by the band shifter;

a determining portion for determining the frequency band of the baseband signal on the basis of the partial signal outputted from the filter portion; and a decoding portion for decoding the baseband signal by using the results of determination by the determining portion.

7. A program for allowing a computer to function as a receiving apparatus, comprising:

a receiving portion for receiving a wireless signal which is generated on the basis of any baseband signal from among a baseband signal having a predetermined frequency band, a baseband signal having the lower band gained by dividing the predetermined frequency band into two portions, and a baseband signal having the upper band gained by dividing the predetermined frequency band into two equal portions;

a signal processing portion for carrying out a frequency conversion on the wireless signal received by the receiving portion so as to generate the baseband signal that has been digitalized at a predetermined sampling rate;

a filter portion for sampling and outputting from the inputted signal a signal component of a frequency band having a bandwidth with approximately 0 Hz as the center frequency, which is gained by multiplying the sampling rate of the inputted signal by the ratio of the bandwidth of the predetermined frequency band to the predetermined sampling rate;

a thinning portion for thinning into half the sampling rate of the baseband signal that has been inputted from the signal processing portion into the filter portion and outputted from the filter portion;

a band shifter for shifting the frequency band of the baseband signal, of which the sampling rate has been thinned by the thinning portion, by such an amount of shift that the center frequency of the lower band or the center frequency of the upper band becomes approximately 0 Hz and inputting the resulting frequency band into the filter portion;

a determining portion for determining the frequency band of the baseband signal that has been generated by the signal processing portion on the basis of the baseband signal that has been inputted from the band shifter into the filter portion and outputted from the filter portion; and a decoding portion for decoding the baseband signal by using the results of determination by the determining portion.

8. A receiving method comprising the steps of:

receiving a wireless signal generated on the basis of a baseband signal having either a predetermined frequency band or a baseband signal having any of partial frequency bands gained by dividing the predetermined frequency band into a number of portions;

carrying out frequency conversion on the wireless signal so as to generate the baseband signal;

shifting the frequency band of the baseband signal by such an amount of shift that the center frequency of at least a specific partial frequency band is in the vicinity of 0 Hz;

outputting a partial signal, which is gained by sampling a signal component of the frequency band having a bandwidth of the specific partial frequency band with approximately 0 Hz as the center frequency, from the baseband signal of which the frequency band has been shifted;

determining the frequency band of the baseband signal on the basis of the partial signal; and decoding the baseband signal by using the results of the determination.

9. A receiving method comprising the steps of:

receiving a wireless signal which is generated on the basis of any baseband signal from among a baseband signal having a predetermined frequency band, a baseband signal having the lower band gained by dividing the predetermined frequency band into two portions, and a baseband signal having the upper band gained by dividing the predetermined frequency band into two portions;

carrying out a frequency conversion on the wireless signal so as to generate the baseband signal that has been digitalized at a predetermined sampling rate;

inputting the baseband signal into a filter for sampling and outputting from the inputted signal a signal component of a frequency band having a bandwidth with approximately 0 Hz as the center frequency, which is gained by multiplying the sampling rate of the inputted signal by the ratio of the bandwidth of the predetermined frequency band to the predetermined sampling rate;

thinning into half the sampling rate of the baseband signal that has been outputted from the filter;

shifting the frequency band of the baseband signal of which the sampling rate has been thinned by such an amount of shift that the center frequency of the lower band or the center frequency of the upper band becomes approximately 0 Hz and inputting the resulting frequency band into the filter;

determining on the basis of the baseband signal that has been outputted from the filter portion the frequency band of the baseband signal that has been generated on the basis of the wireless signal; and decoding the baseband signal by using the results of the determination.

\* \* \* \* \*